United States Patent
Zaldivar et al.

(10) Patent No.: US 12,098,265 B2
(45) Date of Patent: Sep. 24, 2024

(54) METHOD OF FORMING A BIODEGRADABLE AND/OR COMPOSTABLE SPOUT

(71) Applicant: CoCo Taps, Las Vegas, NV (US)

(72) Inventors: Vincent Zaldivar, Las Vegas, NV (US); Veejay C. Patell, Santa Ana, CA (US)

(73) Assignee: CocoTaps, Las Vegas, NV (US)

( * ) Notice: Subject to any disclaimer, the term of this patent is extended or adjusted under 35 U.S.C. 154(b) by 869 days.

(21) Appl. No.: 17/120,969

(22) Filed: Dec. 14, 2020

(65) Prior Publication Data
US 2022/0186034 A1 Jun. 16, 2022

(51) Int. Cl.
*C08L 101/16* (2006.01)
*A23N 1/00* (2006.01)
*B65D 47/12* (2006.01)
*B65D 65/46* (2006.01)
*C08J 3/20* (2006.01)
*A23L 2/04* (2006.01)
*B29C 45/00* (2006.01)
*B29K 67/00* (2006.01)
*B29K 511/00* (2006.01)

(52) U.S. Cl.
CPC .............. *C08L 101/16* (2013.01); *A23N 1/00* (2013.01); *B65D 47/122* (2013.01); *B65D 65/466* (2013.01); *C08J 3/201* (2013.01); *A23L 2/04* (2013.01); *A23V 2002/00* (2013.01); *B29C 45/0001* (2013.01); *B29K 2067/046* (2013.01); *B29K 2511/00* (2013.01); *B29K 2995/006* (2013.01); *C08L 2201/06* (2013.01); *C08L 2207/20* (2013.01)

(58) Field of Classification Search
None
See application file for complete search history.

(56) References Cited

U.S. PATENT DOCUMENTS

| | | | | |
|---|---|---|---|---|
| 10,609,939 | B2 * | 4/2020 | Harding | A47J 19/02 |
| 2005/0107505 | A1 * | 5/2005 | Shinoda | C08L 77/00 |
| | | | | 524/386 |
| 2010/0331464 | A1 * | 12/2010 | Urakami | C08G 63/08 |
| | | | | 524/379 |
| 2020/0253403 | A1 * | 8/2020 | Huang | B29B 7/90 |
| 2021/0009886 | A1 * | 1/2021 | Wang | C08L 71/123 |
| 2021/0347985 | A1 * | 11/2021 | Huang | C08L 97/02 |
| 2022/0275202 | A1 * | 9/2022 | Pärssinen | C08L 67/04 |
| 2022/0371313 | A1 * | 11/2022 | Wang | B32B 27/36 |
| 2022/0380592 | A1 * | 12/2022 | Vandewinckel | C08K 11/005 |
| 2023/0054285 | A1 * | 2/2023 | Wang | C08J 5/06 |
| 2023/0075066 | A1 * | 3/2023 | Shih | C08J 9/0061 |
| 2023/0143142 | A1 * | 5/2023 | Miller | B33Y 10/00 |
| | | | | 156/284 |
| 2023/0364834 | A1 * | 11/2023 | Van Erp | C08J 9/122 |

* cited by examiner

Primary Examiner — Megan McCulley
(74) Attorney, Agent, or Firm — Weiss & Moy, PC; Jeffrey D. Moy

(57) ABSTRACT

A biodegradable and/or compostable device is formed of a plant-based biopolymer in a range of 50 to 80% by volume and a polylactic acid (PLA) in a range of 10 to 30% by volume.

15 Claims, 5 Drawing Sheets

METHOD OF FORMING A BIODEGRADABLE AND/OR COMPOSTABLE SPOUT

RELATED APPLICATIONS

This patent application is related to U.S. Pat. No. 10,609,939, filed Dec. 2, 2014, entitled "COCONUT WATER REMOVAL DEVICE AND METHOD THEREFOR", and which is incorporated herein by reference in its entirety.

TECHNICAL FIELD

The present application relates generally to a spout for dispensing a fluid from a container, and more particularly to a biodegradable spout to access and drink the fluid stored within the container.

BACKGROUND

Pouring elements which allow one to open and access the contents stored in a container may be well known. For example, re-closable pouring elements for throw-away packages have been known for a while. These types of re-closable pouring elements may have a tubular spout member which may allow access to the contents of the throw-away package. A top area of the tubular spout may have threading for removably securing a screw cap thereon. The screw cap may allow one to access the content of the throw-away package as well as to provide a mechanism to reliably reseal and close the throw-away package to prevent the contents from escaping.

Most of these types of pouring elements may be formed by injection molding a plastic material into a mold. Unfortunately, most plastics do not biodegrade to any significant degree, regardless of environmental conditions. Some plastic materials have been designed to biodegrade when exposed to air, water and light. However, many of these types of plastics may be designed to biodegrade in a large composting facility that intentionally accelerates biodegradation in a highly controlled environment using copious air, water and light. However, similar to other biodegradable materials, they likely will not break down in modern landfills that basically store waste and are designed to retard biodegradation.

Besides being dangerous to our ecosystem, the plastic material itself can be harmful to humans. The raw materials and chemicals used to produce plastic packaging have been shown to transfer from the packaging into the products themselves over time. Even simple contact with plastic has been shown to increase exposure to harmful chemicals. Two chemicals in particular used in the plastic manufacturing process are highly dangerous to humans, phthalates and bisphenol-A (BPA). Both chemicals are added to clear plastic during the manufacturing process to increase flexibility and durability.

Therefore, it would be desirable to provide a device and method that overcomes the above. The device and method would provide a pouring element that is biodegradable and/or compostable and not formed from any dangerous chemicals.

SUMMARY

In accordance with one embodiment, a biodegradable and/or compostable device is disclosed. The biodegradable and/or compostable device has a plant-based biopolymer in a range of 50 to 80% by volume and a polylactic acid (PLA) in a range of 10 to 30% by volume.

In accordance with one embodiment, a method of forming a biodegradable and/or compostable dispensing device is disclosed. The method of forming a biodegradable and/or compostable dispensing device comprises: dry mixing a plant based biopolymer and a polylactic acid (PLA); placing the plant based biopolymer and the polylactic acid (PLA) in a hopper, wherein the plant based biopolymer is in a range of 50 to 80% by volume and the polylactic acid (PLA) is in a range of 10 to 30% by volume; feeding the plant based biopolymer and the polylactic acid (PLA) into a barrel having a plurality of heating zones forming a molten mixture, an injection screw moving the molten mixture through the barrel; and injecting the molten mixture into a mold of the dispensing device.

In accordance with one embodiment, a method of forming a biodegradable and/or compostable dispensing device is disclosed. The method of forming a biodegradable and/or compostable dispensing device comprises: dry mixing a plant based biopolymer, a polylactic acid (PLA), coconut husk, coffee grounds and calcium; placing the plant based biopolymer, the polylactic acid (PLA), the coconut husk, the coffee grounds and the calcium in a hopper in a desired ratio, wherein the plant based biopolymer is in a range of 50 to 80% by volume, the polylactic acid (PLA) is in a range of 10 to 30% by volume, the coconut husk is in a range of 0 to 15% by volume, the coffee grounds is in a range of 0.0 to 15% by volume and the calcium is in a range of 0 to 15% by volume; feeding the desired ratio into a barrel having a plurality of heating zones forming a molten mixture, an injection screw moving the molten mixture through the barrel; and injecting the molten mixture into a mold of the dispensing device.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

DESCRIPTION OF THE APPLICATION

Figure 1:
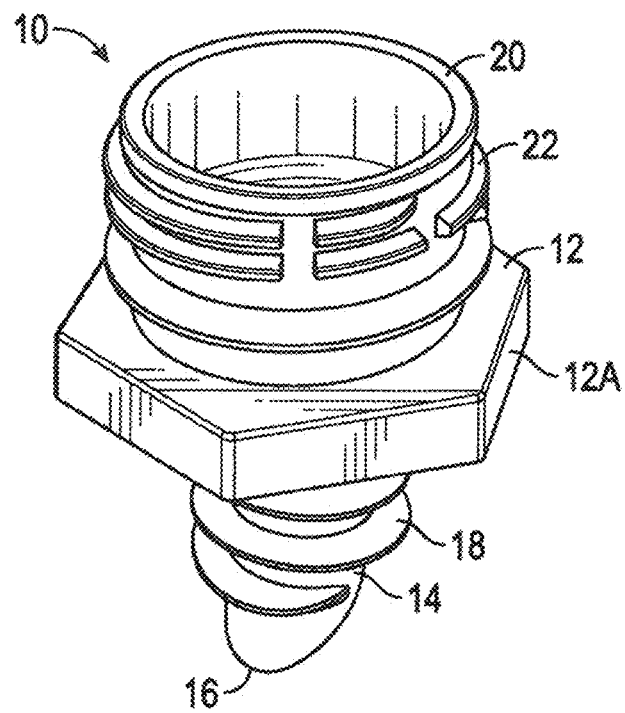
FIG. 1 is a perspective view of an exemplary spout, in accordance with one aspect of the present application.
Figure 2:
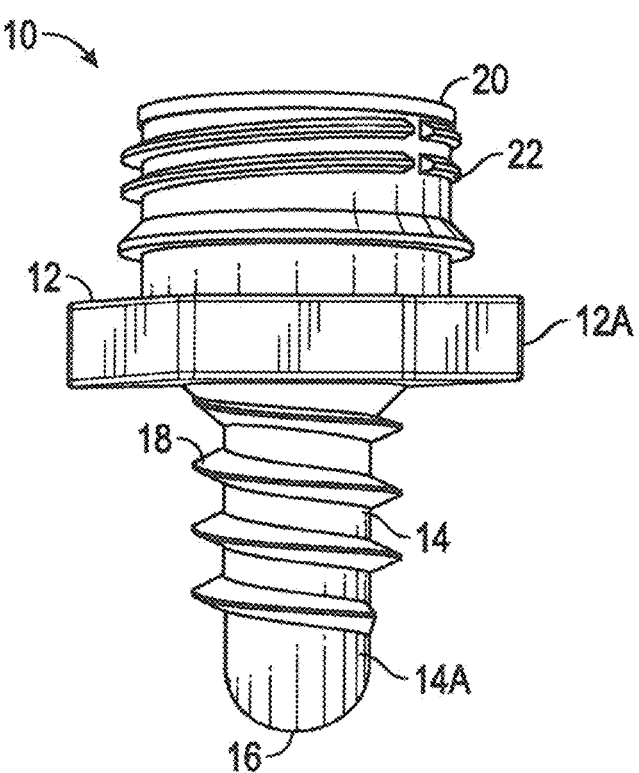
FIG. 2 is a front view of the spout of FIG. 1, in accordance with one aspect of the present application.
Figure 3:
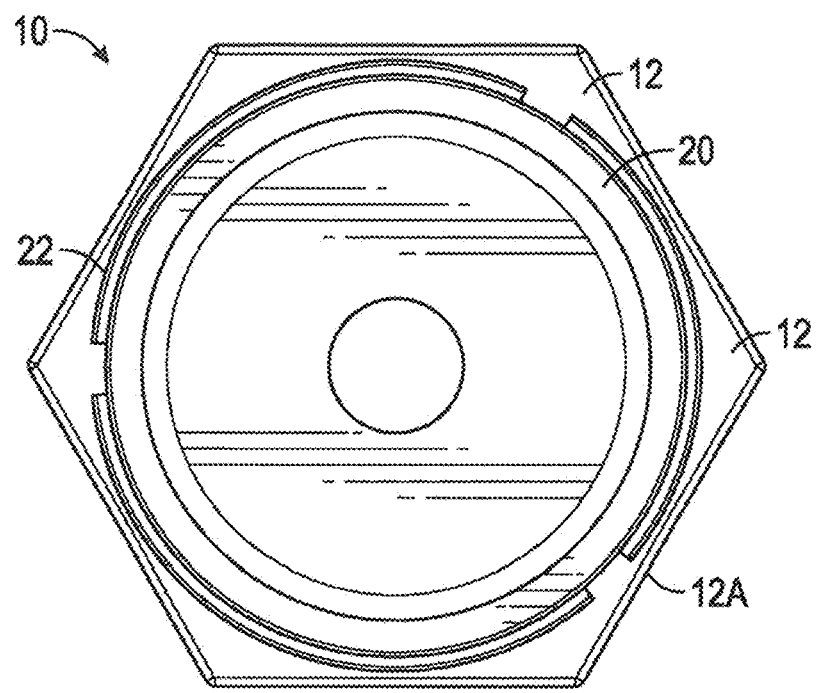
FIG. 3 is a top view of the spout of FIG. 1, in accordance with one aspect of the present application.
Figure 4:
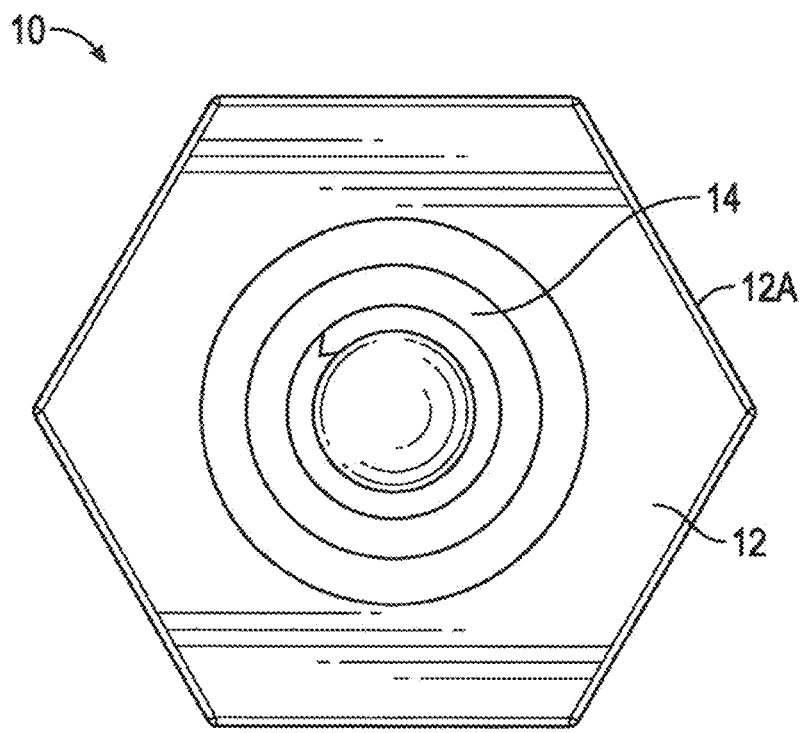
FIG. 4 is a bottom view of the spout of FIG. 1, in accordance with one aspect of the present application.
Figure 5:
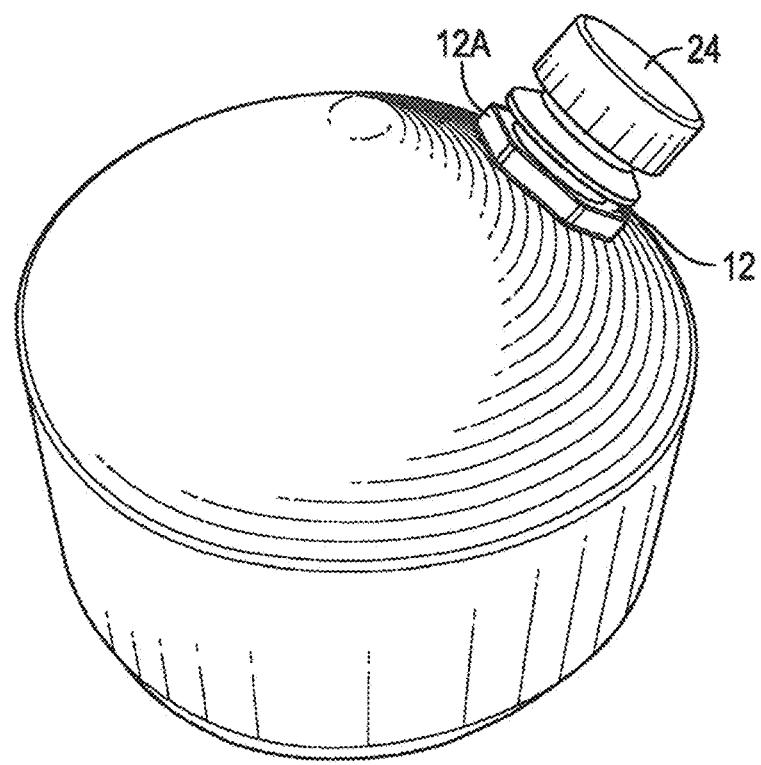
FIG. 5 is a side perspective view of the spout of FIG. 1 inserted into a coconut, in accordance with one aspect of the present application.
Figure 6:
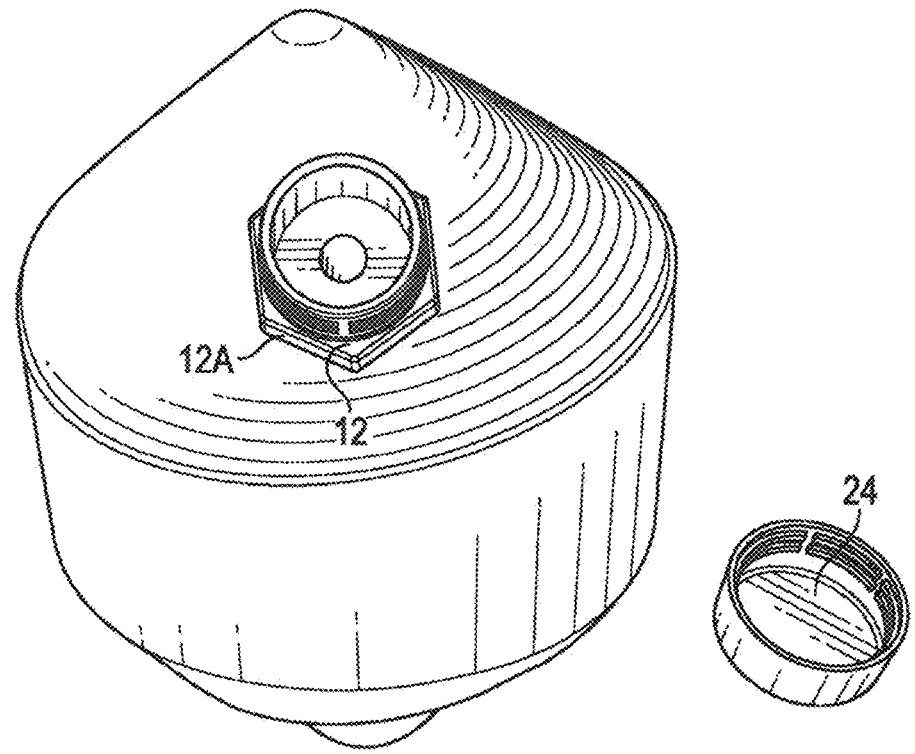
FIG. 6 is a front perspective view of the spout of FIG. 1 inserted into a coconut, in accordance with one aspect of the present application.

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Referring to the FIGS. 1-6, one embodiment of a biodegradable and/or compostable dispensing device 10 (hereinafter device 10) is shown. The device 10 may be used to allow one to open and access the contents stored in a container as well as to close the container for storage after opening. In accordance with one embodiment, the device 10 may be similar to that shown in. U.S. Pat. No. 10,609,939, filed Dec. 2, 2014, entitled "COCONUT WATER REMOVAL DEVICE AND METHOD THEREFOR", and which is incorporated herein by reference in its entirety. In accordance with one embodiment, the device 10 may be inserted into a coconut 26. In this embodiment the device 10 may be used to drain the coconut water formed inside the coconut 26. The device 10 may be used to convert the coconut 26 into a drinking device with a resealable top that can be opened and closed at will. However, the spout 10 of the present application may be used to open and access the contents stored in any container as well as to close the container for storage after opening.

The device 10 may have a base member 12. The base member 12 may have a plurality of flat surfaces 12A formed around an outer perimeter of the base member 12. The number of flat surfaces 12A may vary. The flat surfaces 12A may be arranged so that the base member 12 can be configured as a hardware nut. More specifically, the flat surfaces 12A may be arranged so that the base member 12 can be configured as a hexagonal hardware nut.

A tubular member 14 may extend downward from a central area of the base member 12. A distal end 14A of the tubular member 14 may be cut at an angle to form a pointed edge 16. In accordance with one embodiment, the distal end 14A of the tubular member 14 may be cut at an angle to form a single pointed edge 16. The pointed edge 16 may be configured to allow the device 10 to cut through an exterior of a container. In the embodiment shown in FIGS. 5 and 6, The pointed edge 16 may be configured to allow the device 10 to cut through the outer shell of a coconut 27 and be inserted into the interior of the coconut 27. The tubular member 14 may have threading 18 formed around an exterior surface thereof. The threading 18 is a helical structure used to convert between rotational and linear movement or force. A wrench or similar tool may be used to rotate the device 10 so that threading 18 rotates in a first direction to secure the device 10 into the coconut 27 or to rotate the threading 18 in a second direction to remove the device 10 from the coconut 27

A spout 20 may extend up from a top section of the base member 12. The spout 20 may be in fluid communication with the tubular member 14. Thus, a pathway may be formed from the spout 20, through the base member 12 and through the tubular member 14. Thus, the spout 20 may be used to pour out the coconut water from the interior of the coconut once the device 10 is inserted into the coconut. In accordance with one embodiment, a bottom interior section of the spout 20 may be tapered inwards similar to a funnel. Ribbing 22 may be formed around an outer surface of the spout 20. The ribbing 22 may be used to secure a lid 24 or closure device to the spout 20.

In use, a user of the device 10 may push the pointed edge 16 of the device 10 into the soft "eye" of the coconut. While it is easier to insert the device 10 into the "eye", it may be inserted into other areas of the coconut. A user may then use a wrench or similar tool to rotate the base member 12 thereby causing the threading 18 of the tubular member 14 to rotate into the coconut. The threading 18 can secure the device 10 to the coconut and further prevents leakage of the coconut water from the soft "eye" of the coconut where the device 10 was inserted. Once the device 10 is inserted and tightened, the user may pour the coconut water out via the spout 20 or use the device 10 to drink the coconut water directly from the coconut. The user may place the lid 24 on the device 10 and reseal the coconut if all the coconut water is not drunk.

The device 10 may be biodegradable and/or compostable. The device 10 may be formed of biopolymers. Biopolymers are natural polymers produced by the cells of living organisms. Biopolymers may consist of monomeric units that may covalently bonded to form larger molecules. Biopolymers are biodegradable. These types of biopolymers may be broken down into $CO_2$ and water by microorganisms. In accordance with one embodiment, the device 10 may be formed of compostable biopolymers. Compostable may be defined as a product that may be capable of breaking down into natural elements in a compost environment. The American Society for Testing and Materials (ASTM) defines compostables as anything that undergoes degradation by biological processes during composting to yield $CO_2$, water, inorganic compounds and biomass at a rate consistent with other compostable materials and leaves no visible, distinguishable or toxic residue. Because it is broken down into its natural elements it generally does not cause harm to the environment.

Figure 7:
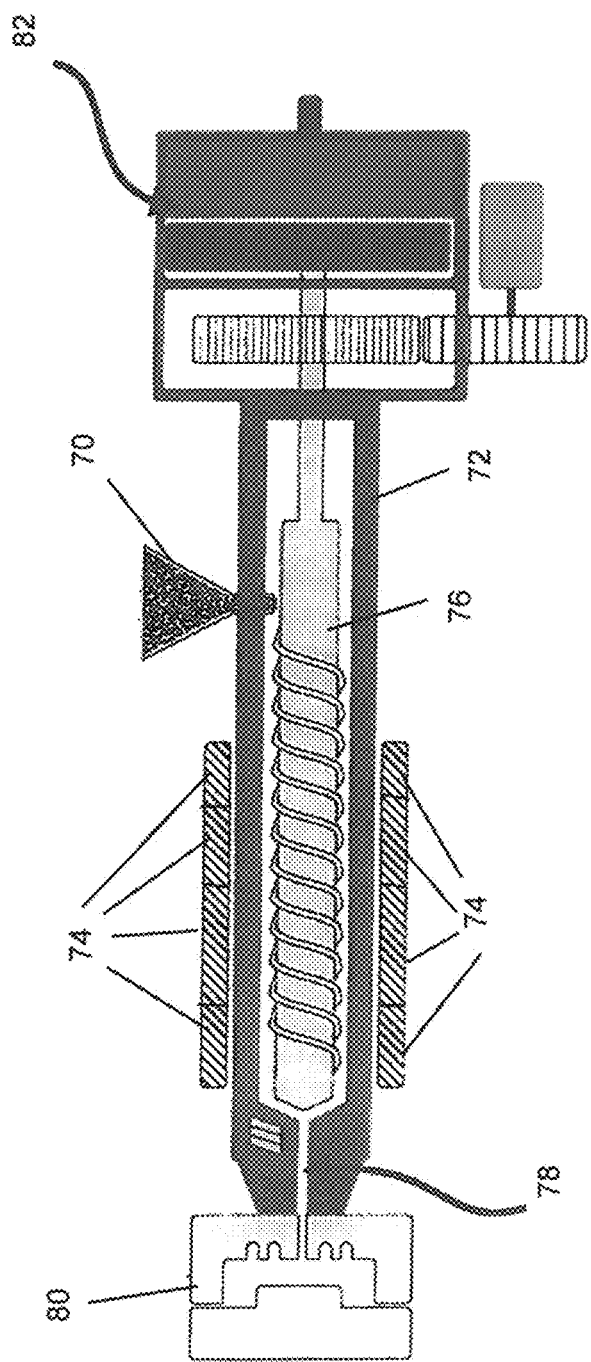
FIG. 7 is a simplified block diagram of an exemplary injection molding machine used to form the exemplary spout shown in FIG. 1, in accordance with one aspect of the present application.
Figure 8:
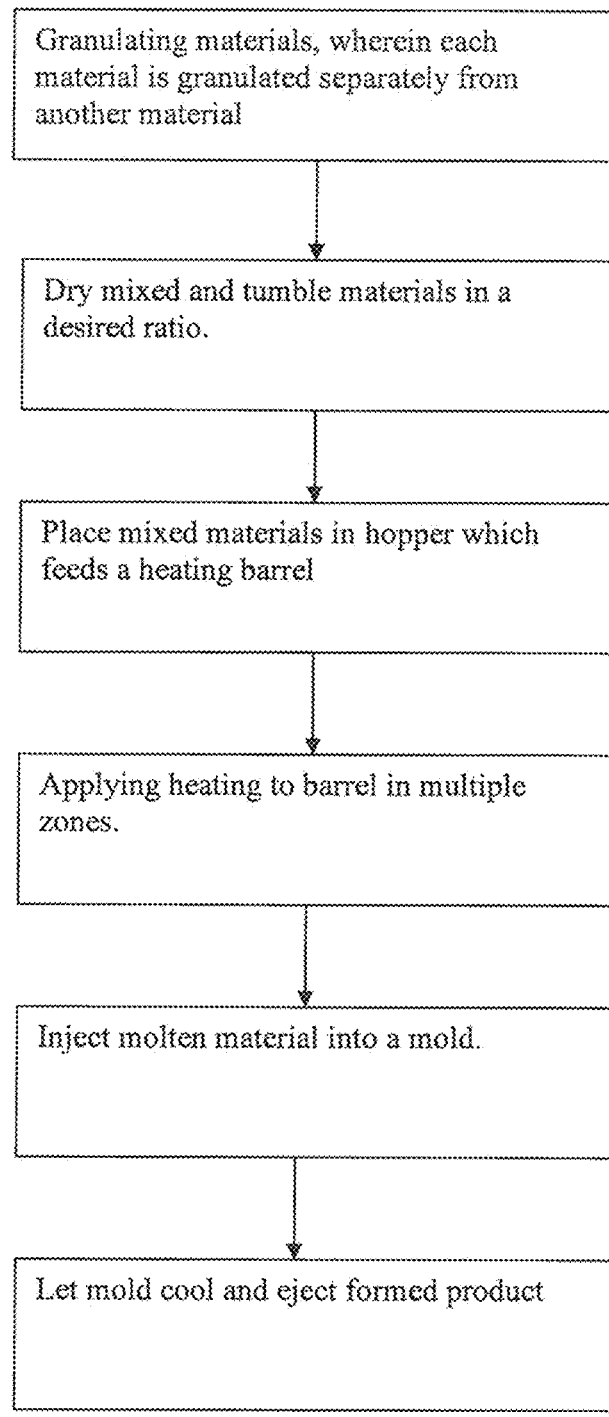
FIG. 8 is a flowchart showing a method of forming an exemplary biodegradable and/or compostable spout, in accordance with one aspect of the present application.

The device 10 may be formed of biodegradable and/or compostable biopolymers in the following manner. Referring to FIGS. 7-8, the device 10 may be formed of a blended ratio of a plant-based biopolymer, polylactic acid, coconut husk, coffee grounds and calcium. Polylactic Acid (PLA) is a bioplastic made from lactic acid and has been used in the food industry to package sensitive food products. However, PLA is too fragile and is not compatible with many packaging manufacturing processes. Therefore. PLA needs to be strengthened with additives in order for it to be used to manufacture the device 10, Thus, the PLA may be combined with a blended ratio of a plant-based biopolymer, coconut husk, coffee grounds and calcium. In accordance with one embodiment, the plant-based biopolymer is a corn starch-based biopolymer.

The above materials may first be granulated. In accordance with one embodiment, the materials are individually granulated. Thus, each material may be granulated separately from a different material. The granulated materials may then be placed in mixer in the following ratios: plant-based biopolymer, 50 to 80% by volume; polylactic acid (PLA), 10 to 30% by volume; coconut husk, 0.0 to 15% by volume; coffee grounds, 0.0 to 15% by volume and calcium, 0.0 to 15% by volume.

However, since PLA may be fragile and may not compatible with many packaging manufacturing processes, the coconut husk and coffee grounds may provide additional structure to reinforce the PLA blend to provide a stronger structure. Thus, in accordance with one embodiment, the materials are then placed in mixer in the following ratios: plant-based biopolymer, 50 to 80% by volume; polylactic acid (PLA), 10 to 30% by volume; coconut husk, 1.0 to 15% by volume; coffee grounds, 1.0 to 15% by volume and calcium, 0.1 to 15% by volume. Higher percentages of structural material to reinforce the PLA blend may provide a stronger structure. Thus, in accordance with one embodiment, the materials are then placed in mixer in the following ratios: plant-based biopolymer, 50 to 80% by volume; polylactic acid (PLA), 10 to 30% by volume; coconut husk, 5 to 15% by volume; coffee grounds, 5 to 15% by volume and calcium, 5 to 15% by volume.

The above materials may be dry mixed and tumbled in the above ratios. Once the materials are mixed, the mixed materials may be placed in a hopper 70 located on the top of an injection molding machine. The mixed materials from the hopper 70 may enter into a barrel 72 located at a bottom of the hopper 70. The barrel 72 may have a plurality of heating zones 74. In accordance with one embodiment, the barrel may have 3 or 4 different heating zones 74 which helps to melt the material mix.

Each heating zone 74 may be individually controlled. This may allow one to set a heating temperature for each individual heating zone 74. In accordance with one embodiment, each heating zone 74 may be heated to a temperature in a range between 300° F. to 400° F. Each heating zone 74 may be controlled so that the temperature gradually increases or decreases in successive heating zones 74. Thus, each heating zone 74 may be controlled so that a first heating zone 74 is the hottest and the last heating zone 74 is the coolest or where the first heating zone 74 is the coolest and the last heating zone 74 is the hottest. In accordance with one embodiment, the heating zones 74 may increase/decrease in increments between 5°-10° F. For example, in accordance with one embedment, the barrel may be divided into 4 different heating zones 74. The first heating zone 74 may be set at 380° F., the second heating zone 74 may be set at 375° F., the third heating zone 74 may be set at 370° F. and the fourth heating zone 74 may be set at 360° F.

An injection screw 76 may be positioned inside the barrel 72. The injection screw 76 may help to mix and move the molten material forward through the different heating zones 74 and to inject the molten material inside a mold 80 through an injection nozzle 78 located at an end of the barrel 72. The injection screw 76 may aid in injecting the molten material inside the mold 80 with required pressure, speed and time. A motor 82 with gearing may be used to rotate the injection screw 76 at a desired speed.

The mold 80 may then be cooled. Once sufficiently cooled, the formed device 10 in the mold 80 may be ejected from the mold 80. The device 10 may then be used and secured to a container in order to access the fluid stored within the container.

While the above method has been described in the formation of the device 10, it may be used to form other items as well. The method may be used to form any type of biodegradable one time use items. For example, the method may be used to form utensils, coffee stirs, lids, and other one-time use items.

The foregoing description is illustrative of particular embodiments of the application, but is not meant to be a limitation upon the practice thereof. The following claims, including all equivalents thereof, are intended to define the scope of the application.

What is claimed is:

1. A method of forming a biodegradable dispensing device comprising:
   dry mixing a plant-based biopolymer and a polylactic acid (PLA) with coconut husks and coffee grounds;
   placing the plant-based biopolymer, the polylactic acid (PLA), the coconut husk and the coffee grounds in a hopper in a desired ratio, wherein the plant-based biopolymer is in a range of 50 to 80% by volume and the polylactic acid (PLA) is in a range of 10 to 30% by volume;
   feeding the ratio of the plant-based biopolymer, the polylactic acid (PLA, the coconut husk and the coffee grounds into a barrel having a plurality of heating zones forming a molten mixture, an injection screw moving the molten mixture through the barrel, wherein each of the plurality of heating zones is heated to a temperature in a range between 300° F. to 400° F.; and
   injecting the molten mixture into a mold of the dispensing device.

2. The method of claim 1, comprising granulating the plant-based biopolymer and the polylactic acid (PLA) prior to dry mixing.

3. The method of claim 1, comprising dry mixing the plant-based biopolymer and the polylactic acid (PLA) with coconut husk, coffee grounds and calcium.

4. The method of claim 3, wherein the ratio comprises the plant-based biopolymer in the range of 50 to 80% by volume, the polylactic acid (PLA) in the range of 10 to 30% by volume; the coconut husk is in a range of 1 to 15% by volume, the coffee grounds are in a range of 1 to 15% by volume and the calcium is in a range of 1 to 15% by volume.

5. The method of claim 3, wherein the ratio comprises the plant-based biopolymer in the range of 50 to 80% by volume, the polylactic acid (PLA) in the range of 10 to 30% by volume, the coconut husk in a range of 5 to 15% by volume, the coffee grounds in a range of 5 to 15% by volume and the calcium in a range of 1 to 15% by volume.

6. The method of claim 1, wherein the ratio comprises the plant-based biopolymer in the range of 50 to 80% by volume, the polylactic acid (PLA) in the range of 10 to 30% by volume, the coconut husk in a range of 1 to 15% by volume and the coffee grounds in a range of 1 to 15% by volume.

7. The method of claim 1, wherein feeding the plant-based biopolymer and the polylactic acid (PLA) into a barrel having a plurality of heating zones forming a molten mixture, comprises: feeding the plant-based biopolymer and the polylactic acid (PLA) into the barrel having at least three heating zones.

8. The method of claim 1, comprising controlling a temperature of each of the plurality of heating zones individually.

9. The method of claim 8, comprising controlling a temperature of each of the plurality of heating zones individually so the temperature of each of the plurality of heating zones decreases from a previous heating zone.

10. A method of forming a biodegradable dispensing device comprising:
    dry mixing a plant-based biopolymer, a polylactic acid (PLA), coconut husks and coffee grounds;
    placing the plant-based biopolymer and the polylactic acid (PLA) in a hopper in a desired ratio, wherein the plant-based biopolymer is in a range of 50 to 80% by volume, the polylactic acid (PLA) is in a range of 10 to 30% by volume, the coconut husks are in a range of 1 to 15% by volume, and the coffee grounds are in a range of 1 to 15% by volume;
    feeding the ratio of the plant-based biopolymer, the polylactic acid (PLA), the coconut husks and coffee grounds into a barrel having a plurality of heating zones forming a molten mixture, an injection screw moving the molten mixture through the barrel; and injecting the molten mixture into a mold of the dispensing device.

11. The method of claim 10, comprising granulating the plant-based biopolymer and the polylactic acid (PLA) prior to dry mixing.

12. The method of claim 10, adding calcium in a range of 1 to 15% by volume.

13. The method of claim 10, comprising heating each of the plurality of heating zones to a temperature in a range between 300° F. to 400° F.

14. The method of claim 10, comprising controlling a temperature of each of the plurality of heating zones individually.

15. The method of claim 14, comprising controlling a temperature of each of the plurality of heating zones individually so the temperature of each of the plurality of heating zones decreases from a previous heating zone.

* * * * *